United States Patent
Tan

(10) Patent No.: US 8,414,025 B2
(45) Date of Patent: Apr. 9, 2013

(54) ENERGY-ABSORBING DEVICE FOR A VEHICLE

(75) Inventor: Soo Aun Tan, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 121 days.

(21) Appl. No.: 13/048,967

(22) Filed: Mar. 16, 2011

(65) Prior Publication Data

US 2012/0235396 A1    Sep. 20, 2012

(51) Int. Cl.
*B62D 21/00* (2006.01)

(52) U.S. Cl. .................................. 280/784; 180/312

(58) Field of Classification Search .................. 280/784, 280/781; 180/311, 312
See application file for complete search history.

(56) References Cited

U.S. PATENT DOCUMENTS

| | | | |
|---|---|---|---|
| 6,003,934 A | 12/1999 | Usui | |
| 6,270,153 B1 | 8/2001 | Toyao et al. | |
| 6,439,650 B2 | 8/2002 | Artner et al. | |
| 6,893,078 B2 | 5/2005 | Saeki | |
| 7,441,819 B2 | 10/2008 | Azzouz et al. | |
| 7,651,155 B2 | 1/2010 | Tan et al. | |
| 7,695,052 B2 | 4/2010 | Nusier et al. | |
| 8,056,926 B2 * | 11/2011 | Okabe et al. | 280/784 |
| 2005/0161935 A1 * | 7/2005 | Ono et al. | 280/834 |
| 2010/0066126 A1 | 3/2010 | Miura et al. | |

FOREIGN PATENT DOCUMENTS

| | | |
|---|---|---|
| DE | 10257260 A1 | 7/2004 |
| JP | 4050083 A | 2/1992 |

* cited by examiner

*Primary Examiner* — Eric Culbreth
(74) *Attorney, Agent, or Firm* — Quinn Law Group, PLLC

(57) ABSTRACT

An energy-absorbing device is provided that is mountable to an engine cradle of a vehicle. The device includes spaced-apart first and second plates having first and second plate lengths respectively, with the first plate length being less than the second plate length. A divider plate is positioned between the first and second plates. Opposing first and second side walls connect the first plate to the divider plate. The first and second side walls have first and second angled edges defining first and second incline angles, respectively, relative to the divider plate. The first and second incline angles are each less than 90 degrees. A distal portion of the device, at least partially defined by the first and second angled edges, is configured to provide lower resistance to an impact force relative to a proximal portion of the device, thereby providing progressive crush resistance.

14 Claims, 2 Drawing Sheets

ENERGY-ABSORBING DEVICE FOR A VEHICLE

TECHNICAL FIELD

The invention relates generally to an energy-absorbing device mountable to a vehicle.

BACKGROUND OF THE INVENTION

Vehicles typically include a bumper at the front and rear of the vehicle to absorb energy during an impact event. An energy-absorbing device is sometimes attached to the vehicle bumper to further absorb impact energy, confining the damage to the energy-absorbing device.

SUMMARY OF THE INVENTION

An energy-absorbing device is provided having dual-resistance capacity to manage impact forces so that a progressive axial crush during a front or rear impact event can be achieved. The device includes spaced-apart first and second plates having first and second plate lengths, respectively, with the first plate length being less than the second plate length. A divider plate is positioned between the first and second plates. Opposing first and second side walls connect the first plate to the divider plate. The first and second side walls have first and second angled edges defining first and second incline angles, respectively, relative to the divider plate. The first and second incline angles are each less than 90 degrees. A distal portion of the device, at least partially defined by the first and second angled edges, is configured to provide lower resistance to an impact force relative to a proximal portion of the device, thereby providing progressive crush resistance.

The device may be mounted to an engine cradle of a vehicle and provides initial stiffness and strength to decelerate the vehicle. By employing the device at the front end of the vehicle, larger powertrains and shorter front end lengths may be used. The thicknesses of the plates and sidewalls may be varied to selectively tune the crush absorbency or resisting force capacity of the device.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 5 is a schematic fragmentary side view of the energy-absorbing device of FIG. 1; and FIG. 6 is a flow chart describing a method for forming the energy-absorbing device of FIG. 1.

DESCRIPTION OF THE PREFERRED EMBODIMENTS

Figure 1:
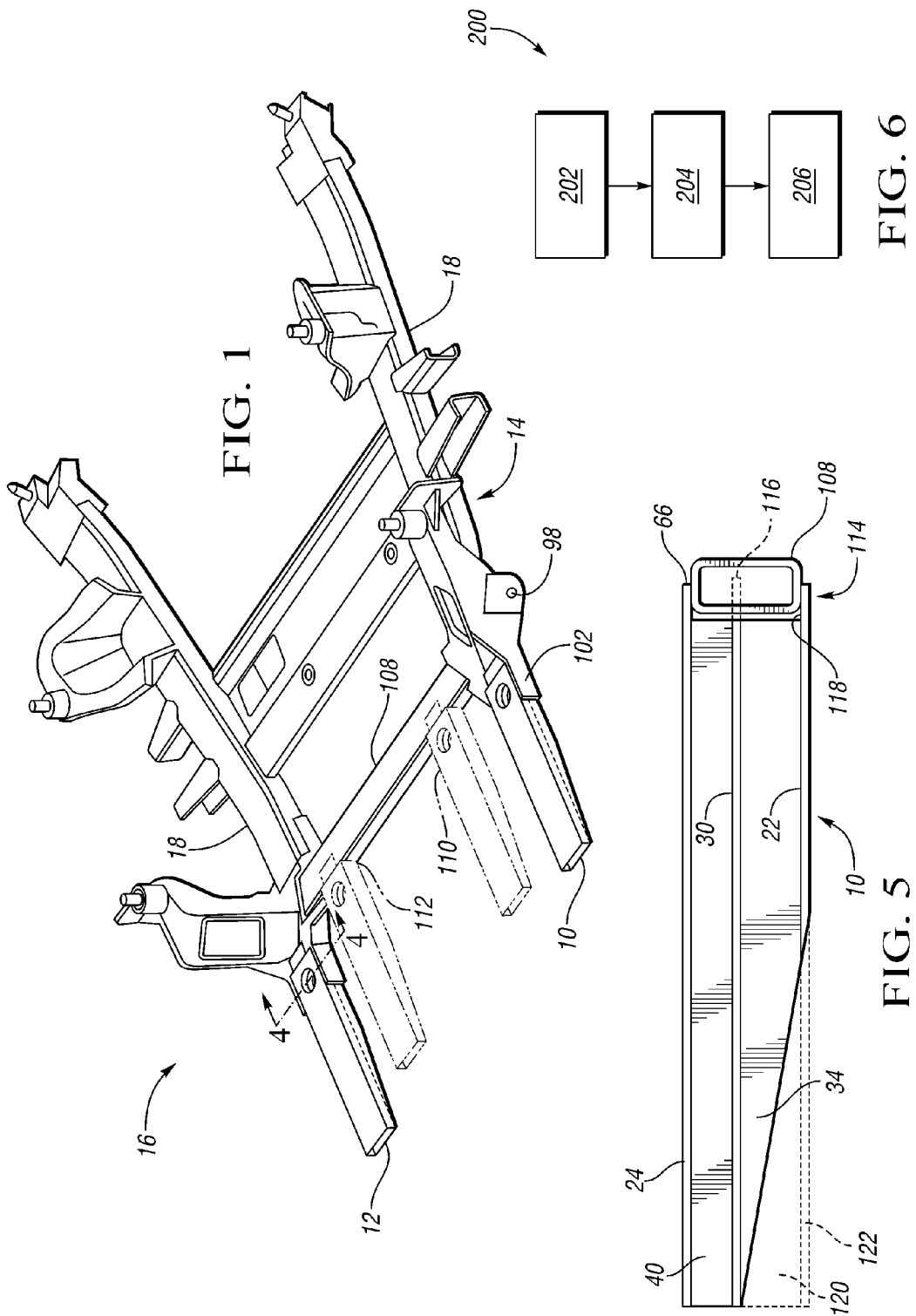
FIG. 1 is a schematic fragmentary perspective view of a portion of a vehicle having an energy-absorbing device mounted thereto.

Referring to the drawings, wherein like reference numbers refer to like components throughout the several views, FIG. 1 shows energy-absorbing devices 10, 12 that are mountable to a component 14 in a vehicle 16, such as an engine cradle 18. The energy-absorbing devices 10, 12 are generally parallel with one another and placed on the left and right sides of the vehicle 16. Although in this embodiment, the energy-absorbing devices 10, 12 are parallel with one another, non-parallel arrangements are also possible.

Figure 2:
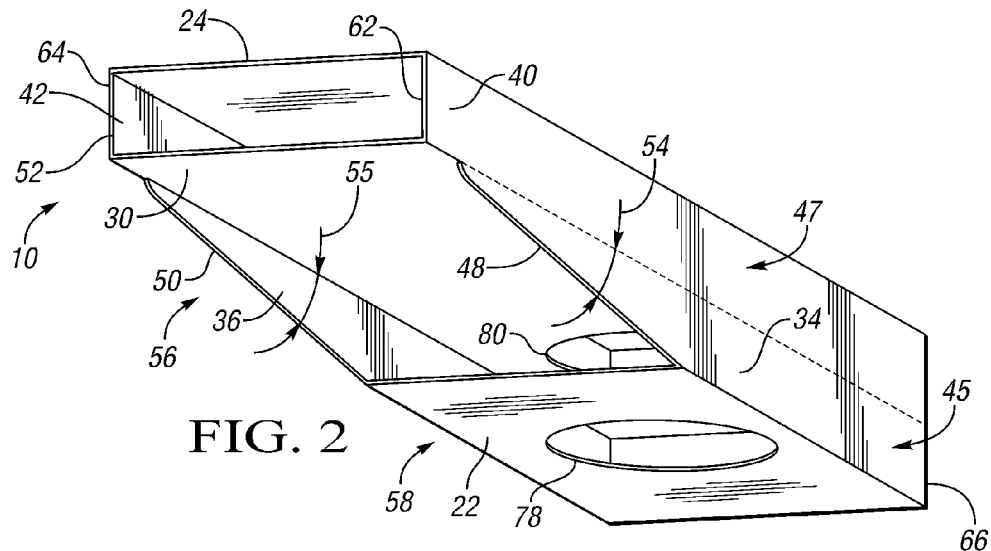
FIG. 2 is a schematic perspective view of the energy-absorbing device of FIG. 1.
Figure 3:
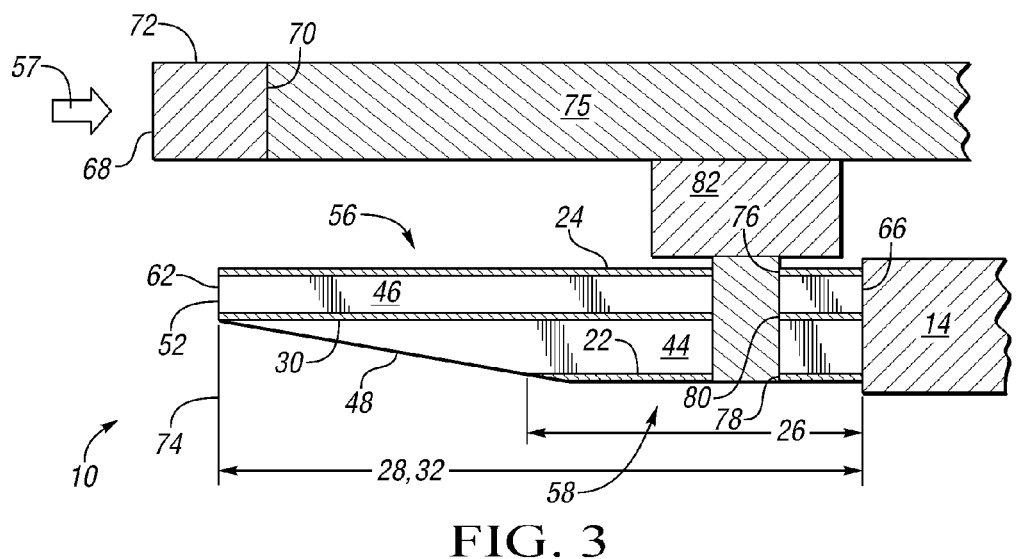
FIG. 3 is a schematic cross-sectional side view of the energy-absorbing device of FIG. 1 also showing portions of the vehicle.

Referring to FIGS. 2-3, the energy-absorbing device 10 includes spaced-apart first and second plates 22, 24 having first and second plate lengths 26, 28, respectively. A divider plate 30 having a divider plate length 32 is positioned between the first and second plates 22, 24, shown in FIGS. 2-3. The first, second and divider plates 22, 24, 30 are generally parallel to each other and extend in a generally fore-and-aft direction. Referring to FIG. 2, opposing first and second side walls 34, 36 connect the first plate 22 to the divider plate 30. Opposing third and fourth side walls 40, 42 connect the second plate 24 to the divider plate 30. As shown in FIG. 3, the first plate length 26 is less than the second plate length 28. The second plate length 28 may be approximately the same as the divider plate length 32. As shown in FIG. 1, the device 10 may be attached to the vehicle 16 with the second plate 24 positioned above the first plate 22. This configuration may be flipped or reversed, where the device 10 is attached to the vehicle 16 with the first plate 22 positioned above the second plate 24.

Referring to FIG. 2, the first and divider plates 22, 30 and first and second side walls 34, 36 surround a first cavity 44 (shown in FIG. 3) and define a first cell 45 (shown in FIG. 2). The second and divider plates 24, 30 and third and fourth side walls 40, 42, surround a second cavity 46 (shown in FIG. 3) and define a second cell 47 (shown in FIG. 2). The device 10 may be formed with additional cells. Referring to FIGS. 2-3, the first and second side walls 34, 36 define first and second angled edges 48, 50 at a distal end 52 of the device 10. As shown in FIG. 2, the first and second angled edges define first and second incline angles 54, 55, respectively, relative to the divider plate 30. Both of the incline angles 54, 55 are less than 90 degrees. In one example, the incline angles 54, 55 are 45 degrees. The incline angles 54,55 can be varied according to load requirements, packaging requirements and other factors. The first incline angle 54 may be different or approximately the same as the second incline angle 55.

Referring to FIGS. 2-3, a distal portion 56 of the device 10, extending at least partially along the first and second angled edges 48, 50 is configured to provide relatively low resistance to an axial impact force 57. A proximal portion 58 of the device 10, extending at least partially along the first plate 26, is configured to provide relatively high resistance to the impact force 57. As is known, a distal portion is situated away from a point of attachment while a proximal portion is situated closer to a point of attachment. The distal portion 56 has a lower resistance or force capacity (relative to the thicker proximal portion 58) due to the first and second angled edges 48, 50. In other words, the first and second angled edges 48, 50 serve to weaken the device 10, such that most of the impact force 57 are absorbed by the distal portion 56. The device 10 provides initial stiffness and strength to decelerate the vehicle 16. Regardless of whether the device 10 is mounted to the front or rear of the vehicle 16, the distal portion 56 of the device 10 is closer to the impact force 57 and the proximal portion 58 is farther from the impact force 57. The proximal portion 58 has a higher resistance or force capacity (relative to the thinner distal portion 56) and does not crush as easily as the distal portion 56. Thus, a progressive axial crush is provided. The impact force 57 is absorbed by deformation of the device 10, and some portion of the impact energy may be transferred to the engine cradle 18.

Referring to FIGS. 2-3, the third and fourth side walls 40, 42 define third and fourth edges 62, 64 at the distal end 52 of the device 10. The third and fourth edges 62, 64 are oriented approximately perpendicularly with respect to the divider plate 30. The third and fourth side walls 40, 42 have a generally rectangular shape. The device 10 may be formed with overlapping holes 76, 78, 80 in the first, second and divider plates 22, 24, 30, respectively, for receiving a secondary vehicle component 82, shown in FIG. 3. In one example, the secondary vehicle component 82 is a radiator assembly.

Referring to FIG. 3, the distal end 52 of the device 10 may extend longitudinally between the front and back ends 68, 70 of a front bumper 72 of the vehicle 16. In one example, the distal end 52 extends longitudinally to approximately a mid-section 74 of the front bumper 72, as shown in FIG. 3. The front bumper 72 is connected to a frame rail extension 75.

Figure 4:
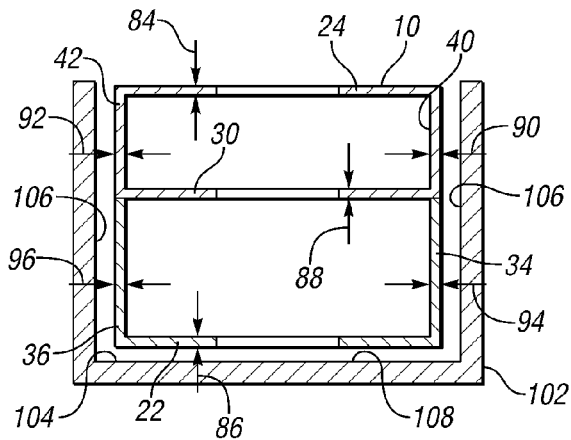
FIG. 4 is a schematic cross-sectional view of the energy-absorbing device of FIG. 1 taken at the lines 4-4 shown in FIG. 1.

Referring to FIG. 4, the first, second and divider plates 22, 24, 30 have thicknesses 86, 84, 88, respectively. The first, second, third and fourth sidewalls 34, 36, 40, 42 have thicknesses 94, 96, 90 and 92, respectively. Optionally, each of the thicknesses may be approximately between 1 mm and 5 mm. The thicknesses may be varied to selectively tune the crush absorbency or resisting force capacity of the device 10. In one example, all the thicknesses are approximately the same. In another example, the thicknesses 84, 86 are 1.5 mm, the thickness 88 is 3 mm, the thicknesses 90, 94 are 2 mm and the thicknesses 92, 96 are 2.5 mm. One skilled in the art may determine the appropriate thickness for each application. In order to minimize mass, the device 10 may be formed having the smallest thickness possible while maintaining a predetermined level of crush absorbency.

Referring to FIG. 3, a proximal end 66 of the energy-absorbing device 10 is operatively connected to a component 14 of the vehicle 16 (such as the engine cradle 18 shown in FIG. 1). The device 10 may be configured as an extension of the engine cradle 18. Referring to FIG. 1, the proximal end 66 may be attached to a cradle mount cast node 98 of the engine cradle 18 through a support member 102. As illustrated in FIG. 4, the proximal end 66 may be fitted into a U-shaped (or inverted U-shaped) pocket 104 defined by the support member 102. Specifically, the first plate 22 of the device 10 interfaces with an internal surface 104 of the support member 102 while the first, second, third and fourth sidewalls 34, 36, 40, 42 interface with an internal surface 106 of the support member 102. Welding, adhesion bonding or mechanical fasteners may be used to secure the interface or joint. Alternatively, the support member 102 may be positioned as an inverted U, in which case the second plate 24 will interface with the internal surface 104 of the support member 102.

Referring to FIG. 1, the devices 10, 12 may also be attached to a front cradle cross-member 108 of the vehicle 16, as shown in phantom at 110 and 112, respectively. Referring to FIG. 5, a cut-out joint 114 may be employed for attaching the device 10 to the cross-member 108. The cut-out joint 114 is created by trimming and removing a portion 116 of the divider plate 30 at the proximal end 66 to create a cavity 118 for receiving the cross-member 108. A portion of the first, second, third and fourth side walls 34, 36, 40, 42 may also be removed. The cavity 118 is at least partially surrounded by the first and second plates 22, 24. Welding, adhesion bonding or mechanical fasteners may be used to secure the cross-member 108 to the cut-out joint 114. Any other suitable method of attaching the device 10 to the cross-member 108 may be used, such as a joint or bracket that is welded, bolted or otherwise rigidly attached to the cross-member 108.

FIG. 6 illustrates a flow chart describing a method 200 for forming the device 10. In step 202, a component is extruded as a single piece with the first, second and divider plates 22, 24, 30 having approximately the same length. At steps 204 and 206, the component is trimmed to produce the device 10 as shown in FIG. 2. Referring to FIG. 5, in step 204, wall portions 120 of the first and second side walls 34, 36 are removed to create first and second angled edges 48, 50 having an incline angle 54 relative to the divider plate 30, with the incline angle 54 being less than 90 degrees. Referring to FIG. 5, in step 206, a plate portion 122 of the first plate 22 is removed such that the first plate 22 is shorter than each of the second and divider plates 24, 30. The trimming may be carried out using a saw-cut operation or any other suitable method. Optionally, a cut-out joint 114 (shown in FIG. 5) may be created by removing a portion 116 of the divider plate 30 and portion of the first, second, third and fourth side walls 34, 36, 40, 42, as described previously. The device 10 may be extruded as a single piece from an aluminum, iron and magnesium alloy, depending on loading requirements. Alternatively, the device 10 may be formed from stamped metal components. In summary, a multi-cell energy-absorbing device 10 is provided with dual-resistance capacity to manage impact forces so that a progressive axial crush during a front or rear impact event can be achieved.

While the best modes for carrying out the invention have been described in detail, those familiar with the art to which this invention relates will recognize various alternative designs and embodiments for practicing the invention within the scope of the appended claims.

The invention claimed is:

1. An energy-absorbing device mountable on a vehicle, the device comprising:
    spaced-apart first and second plates having first and second plate lengths respectively, the first plate length being less than the second plate length;
    a divider plate positioned between the first and second plates;
    opposing first and second side walls connecting the first plate to the divider plate;
    wherein the first and second side walls have respective first and second angled edges defining first and second incline angles, respectively, relative to the divider plate;
    wherein the first and second incline angle are each less than 90 degrees;
    wherein a distal portion of the device is at least partially defined by the first and second angled edges and configured to provide lower resistance to an impact force relative to a proximal portion of the device; and
    wherein the first, second and divider plates include respective apertures sized to receive a secondary vehicle component.

2. The device of claim 1, wherein:
    each of the first, second and divider plates extends in a generally fore-and-aft direction; and
    the divider plate has a divider plate length approximately the same as the second plate length.

3. The device of claim 1, in combination with an engine cradle, wherein:
    the device is mounted to the engine cradle.

4. The device of claim 1, wherein the device is extruded from one of an aluminum, iron and magnesium alloy.

5. The device of claim 1, further comprising:
    opposing third and fourth side walls connecting the second plate to the divider plate; and wherein the third and fourth side walls have third and fourth edges that are approximately perpendicular with respect to the divider plate.

6. The device of claim 1, wherein the first, second and divider plates have a generally rectangular shape.

7. The device of claim 1, wherein the first, second and divider plates each have a thickness approximately between 1 mm and 5 mm.

8. The device of claim 1, wherein the first and second sidewalls each have a thickness approximately between 1 mm and 5 mm.

9. The device of claim 1, in combination with a front bumper, wherein:
- a distal end of the device extends longitudinally to approximately a mid-section of the front bumper.

10. The device of claim 1, in combination with an engine cradle, and further comprising:
- a support member for operatively connecting a proximal end of the device to the engine cradle, the support member defining a pocket; and
- wherein the proximal end is fitted into the pocket defined by the support member.

11. The device of claim 1, in combination with an engine cradle, wherein:
- the engine cradle includes a cross-member; and
- the first and second plates of the device define a cut-out joint configured to receive the cross-member for attachment thereto.

12. A vehicle comprising:
- an engine cradle;
- an energy-absorbing device operatively connectable to the engine cradle, wherein the device includes:
- spaced-apart first and second plates having first and second plate lengths, respectively, the first plate length being less than the second plate length;
- a divider plate positioned between the first and second plates, the divider plate having a divider plate length approximately the same as the second plate length;
- wherein each of the first, the second and the divider plates extends in a generally fore-and-aft direction;
- opposing first and second side walls connecting the first plate to the divider plate;
- wherein the first and second side walls have respective first and second angled edges defining first and second incline angles, respectively, relative to the divider plate;
- wherein the first and second incline angles are each less than 90 degrees;
- wherein a distal portion of the device is at least partially defined by the first and second angled edges and configured to provide lower resistance to an impact force relative to a proximal portion of the device;
- opposing third and fourth side walls connecting the second plate to the divider plate;
- third and fourth edges defined by the third and fourth side walls and oriented approximately perpendicularly relative to the divider plate;
- a front bumper operatively connected to the engine cradle; and
- wherein a distal end of the device extends longitudinally to approximately a mid-section of the front bumper.

13. The vehicle of claim 12, wherein:
- the first and second plates each have a thickness approximately 1.7 mm;
- the divider plate has a thickness approximately 2.8 mm;
- the first and third sidewalls each have a thickness approximately 2.5 mm; and
- the second and fourth sidewalls each have a thickness approximately 2 mm.

14. A method of forming an energy-absorbing device, the method comprising:
- extruding the device as a single piece having spaced-apart first and second plates, and a divider plate positioned between the first and second plates;
- wherein the device includes opposing first and second side walls connecting the first plate to the divider plate and opposing third and fourth side walls connecting the second plate to the divider plate;
- removing a wall portion of each of the first and second side walls to define a first and second angled edge having a first and second incline angle, respectively, relative to the divider plate;
- wherein the first and second incline angles are each less than 90 degrees; and
- removing a plate portion of the first plate such that the first plate is shorter than each of the second and divider plates.

\* \* \* \* \*